United States Patent [19]
Schnaibel et al.

[11] 4,189,093
[45] Feb. 19, 1980

[54] APPARATUS FOR REGULATING THE TEMPERATURE OF A COMPARTMENT OR SPACE

[75] Inventors: Eberhard Schnaibel, Hemmingen; Erich Junginger, Stuttgart, both of Fed. Rep. of Germany

[73] Assignee: Robert Bosch GmbH, Stuttgart, Fed. Rep. of Germany

[21] Appl. No.: 822,452

[22] Filed: Aug. 5, 1977

[30] Foreign Application Priority Data

Aug. 10, 1976 [DE] Fed. Rep. of Germany ....... 2635901

[51] Int. Cl.² ...................... F28F 27/00; G05D 25/00
[52] U.S. Cl. .................................. 236/37; 236/91 F; 236/91 G; 165/40
[58] Field of Search ................ 236/91 F, 91 G, 91 E, 236/37, 10; 165/40; 62/209

[56] References Cited
U.S. PATENT DOCUMENTS 2,403,917  7/1946  Gille ............................... 236/91 F X
3,341,121  9/1967  Attridge, Jr. et al. ......... 236/91 F X
4,058,255  11/1977 Linder ............................. 236/91 F Primary Examiner—William E. Wayner
Attorney, Agent, or Firm—Edwin E. Greigg

[57] ABSTRACT

An apparatus to regulate the temperature of the interior of a motor vehicle, including a room air temperature sensor and a heating air temperature sensor, with the room air temperature sensor providing a substantially higher controlled variable change per unit of temperature change and wherein the sensor signals are summed by a controller. The heating air temperature sensor consists of two series-connected temperature sensors of which one is thermally insulated. The sensor control signal is taken from the junction between these two temperature sensors so as to provide dynamic coupling of the heating air temperature sensor to the room air temperature sensor. In this manner, the room air temperature is sensed precisely and relatively more rapidly so that an excessively large fluctuation of the actual temperature is avoided if the heating output of the heat exchanger varies between a high and a low value.

4 Claims, 2 Drawing Figures

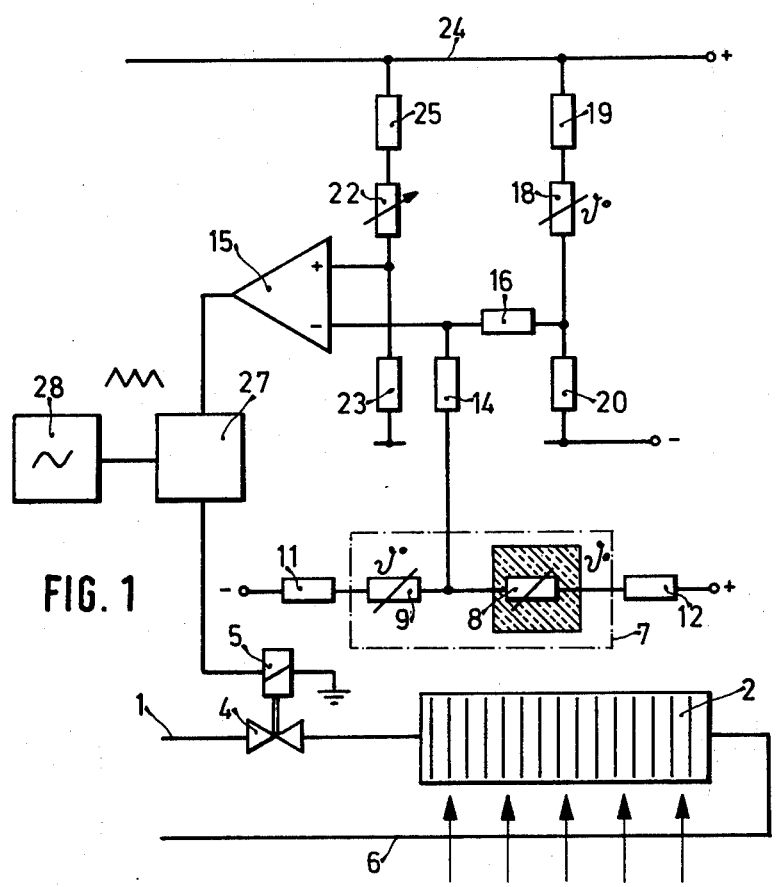
FIG. 1
FIG. 2
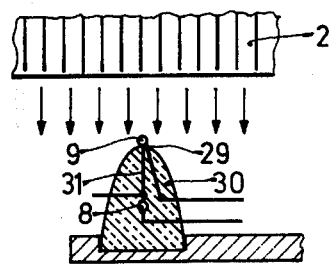

4,189,093

APPARATUS FOR REGULATING THE TEMPERATURE OF A COMPARTMENT OR SPACE

BACKGROUND OF THE INVENTION

The invention relates to an apparatus for regulating the temperature of a room or interior space. A known apparatus for controlling the heating of the interior space of a motor vehicle provides an interior room temperature sensor and an outside temperature sensor, connected in series, as well as a set point or reference source. The flow of heating medium through a heat exchanger is controlled on the basis of the sum of the signals from these sensors. However, a precise comparison with a preset set point value is not possible by these means. The known apparatus offers substantial relative advantages, but it also entails the disadvantage that the influence of the heating air temperature sensor on the heat exchanger is greater during a high heat output than during a low heat output, due to the additive combination of the controlled variables. The reverse is true of the influence of the interior space temperature sensor on the sum of the controlled variables. Correspondingly, for a constant preset set point, a relatively lower actual space temperature is obtained when the heat exchanger must be operated at a high heat output.

OBJECT AND SUMMARY OF THE INVENTION

It is thus a principal object of the present invention to provide an apparatus for controlling the heating of an interior space, in particular the cabin of an automobile.

More particularly, it is an object of the invention to provide a controller which maintains the room temperature within relatively narrow limits even when the heater output power varies.

Another object of the invention is to provide a controller in which the space or room temperature is sensed relatively more rapidly than the heater output temperature.

These and other objects are attained according to the invention by providing a controller with two temperature sensors, respectively associated with the heater air and with the space or room air, and by coupling these two sensors dynamically.

In a preferred embodiment of the invention, the heater air temperature sensor consists of two temperature sensors connected in series within a voltage divider. One sensor is thermally insulated while the other is directly exposed to the heating air flow. The controlled variable, i.e. the signal from this sensor, is taken from the junction between the two sensors and is added to the signal from the room temperature sensor. This disposition results in a simple yet effective coupling of the two air temperature sensors.

The invention will be better understood as well as further objects and advantages thereof become more apparent from the ensuing detailed description of a preferred embodiment of the invention, taken in conjunction with the drawing.

BRIEF DESCRIPTION OF THE DRAWING

FIG. 1 is a schematic circuit diagram of a preferred embodiment of the apparatus of the invention; and FIG. 2 illustrates a possible construction of the heating air temperature sensor.

DESCRIPTION OF THE PREFERRED EMBODIMENT

In the exemplary embodiment illustrated in FIG. 1, a heating medium conduit 1 supplies a heat exchanger 2 of a motor vehicle heating system via a valve 4, actuatable by means of a solenoid 5. The heat exchanger 2 is connected in a known manner to the cooling system by the heater conduit 1 and a return line 6.

The temperature of the air passing from the heat exchanger to the interior space of the passenger compartment is monitored by a heating air temperature sensor assembly 7 consisting of two identical temperature-sensitive elements such as, for example, NTC resistors or semiconductor elements and it is located directly at the outlet of the heat exchanger. One of these temperature sensors is embodied as a thermally insulated temperature sensor 8 and the other as an uninsulated temperature sensor 9. Both sensors are connected in a known manner in series within a voltage divider, which further includes resistors 11 and 12, connected respectively between the temperature sensor 8 and the positive supply line and between the temperature sensor 9 and the negative supply line. The junction of the temperature sensors 8 and 9 is connected via a resistor 14 to the inverting input of an operational amplifier 15. This input is further connected via a resistor 16 to a second voltage divider. The second voltage divider consists of a resistance element which serves as the space or room temperature sensor 18, connected in series with a resistor 19 to the positive supply line and via a resistor 20 to the negative supply line. The room temperature sensor 18 may, for example, be embodied in the same manner as the temperature sensors 8 and 9, i.e. as a silicon diode or as an NTC resistance.

It is a significant feature of the present invention that the magnitude of the coefficient of the change of resistance per unit of temperature change is substantially greater for the room temperature sensor 18 than it is for the temperature sensors 8 and 9. The signal from the room temperature sensor 18 is taken from the junction with the resistor 20 and is passed via the resistor 16 to the inverting input of the operational amplifier 15. The non-inverting input of the operational amplifier 15 is connected to a voltage divider consisting of a variable resistor which serves as the reference, or set-point source 22 and of a resistor 23. The set-point source 22 is connected via an adapter resistor 25 to the positive supply line 24.

The output of the operational amplifier leads to a comparator 27 whose other input is connected to a signal generator 28 that generates a sawtooth voltage at a fixed frequency. The comparator 27 and the generator 28 together comprise a pulse former which, in known manner, generates a square-wave voltage at the fixed frequency of the sawtooth voltage generated by the generator 28, as long as the output voltage of the operational amplifier does not exceed or fall below the amplitude bandwidth of the sawtooth voltage. The output of the comparator 27 controls the magnetic windings 5 of the valve 4, so that the valve 4 is switched open or closed in accordance with the pulses received.

Accordingly, it is to be understood that the above described apparatus functions as follows:

The operational amplifier 15 connected as a summing amplifier, is arranged to receive the added signals of the temperature sensors 18 and 7 and, in accordance with the deviation from the given set-point voltage, produces a varying output voltage which is converted into a corresponding pulse sequence so long as it is remains within the proportional control region defined by the amplitude limits of the sawtooth voltage. The pulses actuate the valve 4 and control the flow of the heating medium. When the control deviation from the set-point value is too large, the magnetic winding 5 of the valve 4 receives a maximal voltage or zero voltage, depending, respectively, on whether the space temperature is too low or too high. The pulsed actuation of the valve 4 makes the flow of heating medium to the heat exchanger 2 quasi-continuous within the region of proportionality, even though the valve itself is either fully open or fully closed. This brings the advantage that the valve can be of simple construction and will operate very reliably. Its power requirements are very slight while providing fast and precise regulation. There are no hysteresis effects which might lead to excessive fluctuations of the space temperature, yet this method of control provides the advantage of a rapid heating of the passenger compartment of the motor vehicle from a cold condition.

The precision of the regulation is further enhanced by the fact that the heating air temperature sensor 7 and the compartment temperature sensor 18 exhibit dissimilar thermal coefficients of resistance. Normally, the temperature of the vehicle interior changes only slowly relative to the temperature of the air leaving the heat exchanger 2. Accordingly, the space temperature sensor 18 is so constructed as to generate a substantially greater signal than the sensor 7 for the same change of temperature. Thus, expected changes of the space temperature which are due to the increased heating air temperatures are detected sensitively and early. On the other hand, the thermal coefficient of resistance of the heating air temperature sensor must be very low in order to prevent excessively large control fluctuations during differing heating requirements. If, for example, high temperatures are needed at the heat exchanger 2 then the influence of this variable on the sum of the signals is comparatively large so that, in this case, the resultant space temperature will be lower than in the opposite case in which only a low heater heat output is needed. The essential advantage of the invention derives from the fact that the heating air temperature sensor assembly consists of two temperature sensors 8 and 9, connected in series. The thermally insulated temperature sensor 8 gauges the changes of the heating air temperature only very slowly, due to its large time constant, so that its instantaneous resistance corresponds to a mean temperature of the heated air. By contrast, the temperature sensor 9 is directly exposed to the air flow from the heat exchanger 2 and its resistance follows the temperature changes very rapidly. The control signal taken from the junction of the two temperature sensors 8 and 9 is thus dominated by the dynamics of the temperature changes taking place at the heat exchanger 2, and only to a lesser degree by the static temperature level. In this manner, the deviation of the actual temperature from the desired value is kept very small.

A dynamic coupling of the controlled variable of a simple air termperature sensor could admittedly also be accomplished capacitively by means of a difference detecting component, but, in contrast with the invention herein, this could hardly be realized at a reasonable cost due to the magnitude of the necessary coupling time constants.

FIG. 2 is an illustration of an exemplary embodiment of the heating air temperture sensor assembly 7. The temperature sensor 9 is seen to be located at the apex 29 of a thermally insulating conical body 30, and is connected by a conductor 31 to the temperature sensor element 8 that lies in the interior of the heat insulating body 30. The free electrodes of the temperature sensors are connected to the resistors 11 and 12, respectively, and the conductor 31 is connected to the resistor 14 of FIG. 1. The thermally insulating body 30 is located in the immediate proximity of the outlet of the heat exchanger 2.

The foregoing relates to preferred, although merely exemplary embodiments of the invention, it being understood that other embodiments and variants thereof are possible within the spirit and scope of the invention.

What is claimed is:

1. An apparatus for regulating the temperature of a compartment or room, said apparatus including:
 a heat exchanger for providing heated air to said room;
 a valve for controlling the flow of heating medium in said heat exchanger;
 a first temperature sensor for generating a first signal related to the temperature of the air in said room;
 a second temperature sensor for generating a second signal related to the temperature of the heated air from said heat exchanger;
 control means for receiving and summing said first and second signals, for comparing the sum to a reference value and for generating an output signal to control the actuation of said valve; and wherein the improvement comprises:
 said second temperature sensor including means responsive to the dynamic rate of change in the heated air temperature and means responsive to the static temperature under equilibrium conditions of the heated air whereby excessively large control fluctuations during differing heating requirements are prevented.

2. An apparatus as defined by claim 1, wherein said second temperature sensor includes two temperature-sensitive elements connected in electrical series, one of said two elements being provided with thermal insulation while the other is exposed directly to the heated air from said heat exchanger, said two elements being connected within a voltage divider chain, the junction between said two elements being the point from which said second signal is taken.

3. An apparatus as defined in claim 2, wherein said control means includes an operational amplifier, one input of which receives said first and second signals via respective summing resistors, while the other input of said operational amplifier receives a datum from an adjustable set point generator, the output of said operational amplifier being connected to the actuating windings of said valve for controlling the flow of said heating medium.

4. An apparatus as defined by claim 3, further comprising a pulse former circuit, connected between said operational amplifier and said valve, for generating pulses of constant frequency and variable pulsewidth, said pulsewidth being dependent on the magnitude of the output signal from said operational amplifier and wherein said valve is a magnetic on/off switching valve.

* * * * *